(12) United States Patent
Tahara et al.

(10) Patent No.: US 9,037,375 B2
(45) Date of Patent: May 19, 2015

(54) VEHICLE BRAKE SYSTEM

(71) Applicant: HONDA MOTOR CO., LTD., Minato-ku, Tokyo (JP)

(72) Inventors: Shunpei Tahara, Wako (JP); Tohru Ikeda, Wako (JP); Kazuya Sakurai, Wako (JP); Yoshinari Sugita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/282,157

(22) Filed: May 20, 2014

(65) Prior Publication Data

US 2014/0350816 A1 Nov. 27, 2014

(30) Foreign Application Priority Data

May 22, 2013 (JP) ................................ 2013-108181

(51) Int. Cl.
*B60T 8/44* (2006.01)

(52) U.S. Cl.
CPC ....................................... *B60T 8/44* (2013.01)

(58) Field of Classification Search
CPC ....... B60T 8/3265; B60T 8/3275; B60T 8/34; B60T 8/1755; B60T 8/17551
USPC .......... 701/48, 70, 78, 83; 180/275, 338, 282, 180/337; 188/361, 150; 303/16, 113.3, 303/114.1, 191
See application file for complete search history.

(56) References Cited

U.S. PATENT DOCUMENTS

| | | | |
|---|---|---|---|
| 6,056,373 A | 5/2000 | Zechmann et al. | |
| 2006/0287797 A1* | 12/2006 | Haller et al. | 701/70 |
| 2010/0198449 A1* | 8/2010 | Ueoka et al. | 701/29 |

(Continued)

FOREIGN PATENT DOCUMENTS

| | | |
|---|---|---|
| DE | 196 25 919 A1 | 1/1998 |
| DE | 103 43 985 A1 | 4/2004 |
| JP | 2010-100134 A | 5/2010 |

OTHER PUBLICATIONS

Search Report issued on Feb. 12, 2015 by the DPMA in the corresponding DE patent application DE 10 2014 209 648.0 and the English translation thereof.

(Continued)

*Primary Examiner* — Mary Cheung
*Assistant Examiner* — Rodney Butler
(74) *Attorney, Agent, or Firm* — Carrier Blackman & Associates, P.C.; William D. Blackman; Joseph P. Carrier (57) ABSTRACT

Provided is a vehicle brake system capable of reducing a sense of discomfort felt by a driver, even if a transmission is shifted when a braking force holding function for keeping a vehicle stationary is in operation. A vehicle brake system includes a control system capable of determining whether an automatic transmission is set in a driving mode or in a non-driving mode, and is capable of operating the braking force holding function for keeping the vehicle stationary by holding a braking force generated through a brake pedal operation. Further, the control system operates the braking force holding function when a vehicle speed becomes lower than a predetermined threshold value by the braking force generated through the brake pedal operation, and if the control system determines that the automatic transmission is set in a non-driving mode, the control unit increases the braking force and holds the braking force.

5 Claims, 6 Drawing Sheets

(56) References Cited

U.S. PATENT DOCUMENTS

2011/0224881 A1* 9/2011 Matsushita .................... 701/70
2012/0109482 A1* 5/2012 Yoshii ............................ 701/70
2014/0081498 A1* 3/2014 Weng et al. .................... 701/22

OTHER PUBLICATIONS

Office Action issued on Feb. 12, 2015 by the DPMA in the corresponding DE patent application 10 2014 209 648.0 and the English translation thereof.

* cited by examiner

VEHICLE BRAKE SYSTEM

CROSS REFERENCE TO RELATED APPLICATIONS

This application claims the foreign priority benefit under Title 35, United States Code, 119 (a)-(d) of Japanese Patent Application No. 2013-108181 filed on May 22, 2013 in the Japan Patent Office, the disclosure of which is herein incorporated by reference in its entirety.

TECHNICAL FIELD

The present invention relates to a vehicle brake system.

BACKGROUND ART

A vehicle brake device (vehicle brake system) which has a hydraulic holding function is, for example, disclosed in Patent Document 1. When a driver generates a braking force to a vehicle by operating a brake operation unit (brake pedal or the like), even if the driver releases the brake operation unit when the vehicle is stopped and in a stationary state, the hydraulic holding function keeps the vehicle stationary by holding the braking force.

CITATION LIST

Patent Literature

{Patent Document 1}
Japanese Patent Application Publication No. 2010-100134

SUMMARY OF INVENTION

Technical Problem

If the vehicle brake device described in Patent Document 1 is included in a vehicle equipped with an automatic transmission as a transmission, when the automatic transmission is shifted to a drive mode from a neutral mode while the hydraulic holding function is in operation, a creep force is applied to the vehicle.

Therefore, when the hydraulic holding function is in operation as a braking force holding function and the vehicle is kept stationary, if the automatic transmission is shifted to the drive mode from the neutral mode, the driver feels a sense of discomfort because the vehicle starts moving for a moment. Therefore, an object of the present invention is to provide a vehicle brake system capable of reducing the sense of discomfort felt by the driver, even if the transmission is shifted when the braking force holding function for keeping the vehicle stationary is in operation.

Solution to Problem

In order to solve the above problem, a vehicle brake system according to the present invention includes a control unit capable of determining whether a transmission is set in a driving mode, in which a power outputted by a power unit of a vehicle is transmitted to driving wheels, or in a non-driving mode other than the driving mode, and a booster unit for increasing a braking force generated when a brake operation unit is operated, and the vehicle brake system is configured to be able to operate a braking force holding function for holding the braking force which is generated by operating the brake operation unit. Further, the vehicle brake system is characterized in that the control unit operates the braking force holding function when the braking force is applied and a speed of the vehicle becomes lower than a predetermined speed threshold value, and when the control unit operates the braking force holding function and determines that the transmission is set in the non-driving mode, the control unit increases the braking force, which is generated by operating the brake operation unit, by the booster unit and holds the braking force.

According to the present invention, when the control unit operates the braking force holding function for keeping the vehicle stationary by holding the braking force generated by operating the brake operation unit, if the transmission is set in the non-driving mode (the neutral mode or the like), the vehicle brake system can increase the braking force and hold it. If the transmission is an automatic transmission, when the transmission is shifted to the driving mode (the drive mode or the like), a creep force is applied to the vehicle, and if the braking force is small when the braking force holding function is in operation, the vehicle starts moving by the creep force in some cases. In a state where the transmission is set in the non-driving mode, when the braking force holding function is in operation, the vehicle brake system increases the braking force and holds it. Hereby, the vehicle is prevented from starting moving due to the creep force, and thus a sense of discomfort felt by the driver can be reduced.

Further, the vehicle brake system according to the present invention is characterized in that when the control unit operates the braking force holding function and determines that the transmission is set in the non-driving mode, if the braking force generated by operating the brake operation unit is smaller than a predetermined defined braking force, the control unit increases the braking force by the booster unit up to the defined braking force and holds the braking force.

According to the present invention, if the transmission is set in the non-driving mode when the braking force holding function is in operation, the braking force is increased to the defined braking force by the booster unit only when the braking force generated by operating the brake operation unit is smaller than the predetermined defined braking force set in advance. Therefore, the driving of the booster unit becomes limited, and thus it is possible to suppress energy consumption due to the driving of the booster unit.

Further, a vehicle brake system according to the present invention is characterized in that the vehicle brake system includes a control unit capable of determining whether a transmission is set in the driving mode, in which a power outputted by a power unit of a vehicle is transmitted to driving wheels, or in the non-driving mode other than the driving mode, and is configured to be able to operate a braking force holding function for holding a braking force which is generated by operating a brake operation unit. Furthermore, the vehicle brake system is characterized in that when the braking force is applied and a speed of the vehicle becomes lower than a predetermined speed threshold value, if the control unit determines that the transmission is set in the non-driving mode, the control unit operates the braking force holding function when the braking force is more than or equal to a predetermined defined braking force.

According to the present invention, if the control unit determines that the transmission is in the non-driving mode when it determines that the vehicle is stopped, the control unit operates the braking force holding function when the braking force generated by operating the brake operation unit is more than or equal to the predetermined defined braking force. Therefore, the vehicle brake system keeps the braking force of sufficient magnitude to prevent the vehicle from starting moving due to the creep force, and thus operates the braking force holding function. Hereby, even if the transmission is shifted to the driving mode, the vehicle is prevented from starting moving due to the creep force, and thus the sense of discomfort felt by the driver can be reduced.

Advantageous Effects of Invention

According to the present invention, it is possible to provide a vehicle brake system capable of reducing a sense of discomfort felt by a driver even if the transmission is shifted when the braking force holding function for keeping the vehicle stationary is in operation.

DESCRIPTION OF EMBODIMENTS

First Embodiment

Figure 1:
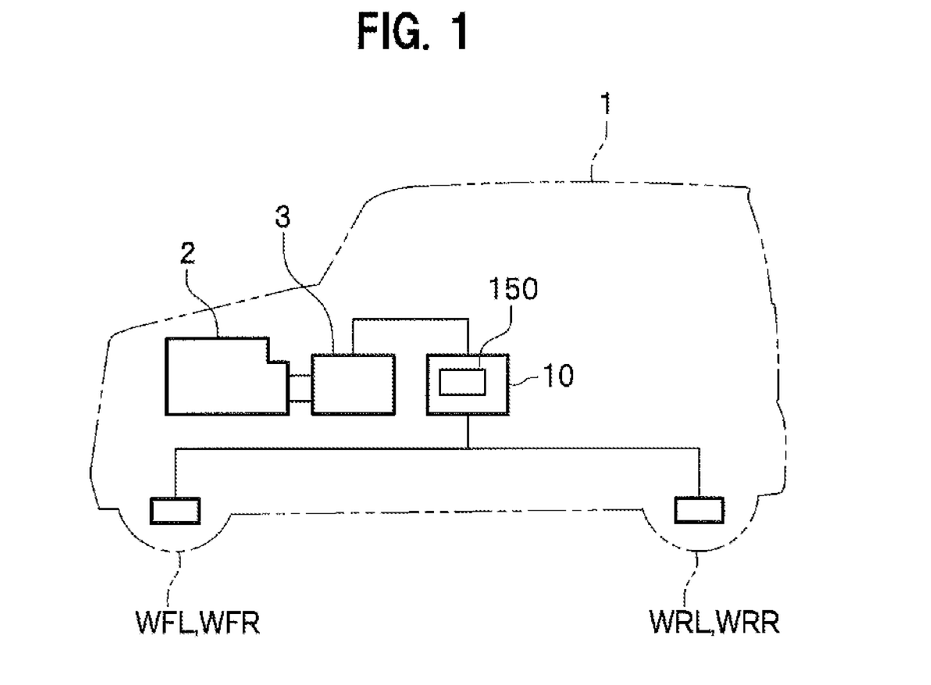
FIG. 1 is a block diagram of a vehicle according to a first embodiment of the present invention.

Hereinafter, a first embodiment according to the present invention will be described in detail with reference to the accompanying drawings. FIG. 1 is a block diagram of a vehicle according to the first embodiment, and FIG. 2 is a schematic block diagram of a vehicle brake system according to the first embodiment.

A vehicle brake system 10 according to the first embodiment is included in a vehicle 1 which is configured as shown in FIG. 1. The vehicle 1 is configured to travel by transmitting a power outputted through a power unit such as an internal combustion engine (an engine 2) to drive wheels (for example, a right front wheel WFR and a left front wheel WFL), and includes an automatic transmission 3 as a transmission between the driving wheels and the engine 2. Further, the vehicle 1 includes the vehicle brake system 10 for applying a braking force to each of wheels (the right front wheel WFR, the left front wheel WFL, a left rear wheel WRL, a right rear wheel WRR) by being controlled by a control unit 150. Then, the control unit 150 of the first embodiment is configured to be inputted a signal indicating a mode of the automatic transmission 3 selected by an unillustrated selector lever or the like. Incidentally, the vehicle 1 may include driving wheels of the left rear wheel WRL and the right rear wheel WRR, or include driving wheels of all.

The automatic transmission 3 of the first embodiment can be set in a driving mode (a drive mode, a reverse mode, or the like), in which the power outputted by the engine 2 is transmitted to the driving wheels (the right front wheel WFR, the left front wheel WFL), or in a non-driving mode (a neutral mode, a parking mode, or the like) other than the drive modes. Further, the control unit 150 is configured to be capable of determining, by the signal indicating the mode, whether the automatic transmission 3 is set in the driving mode or is set in the non-driving mode.

Figure 2:
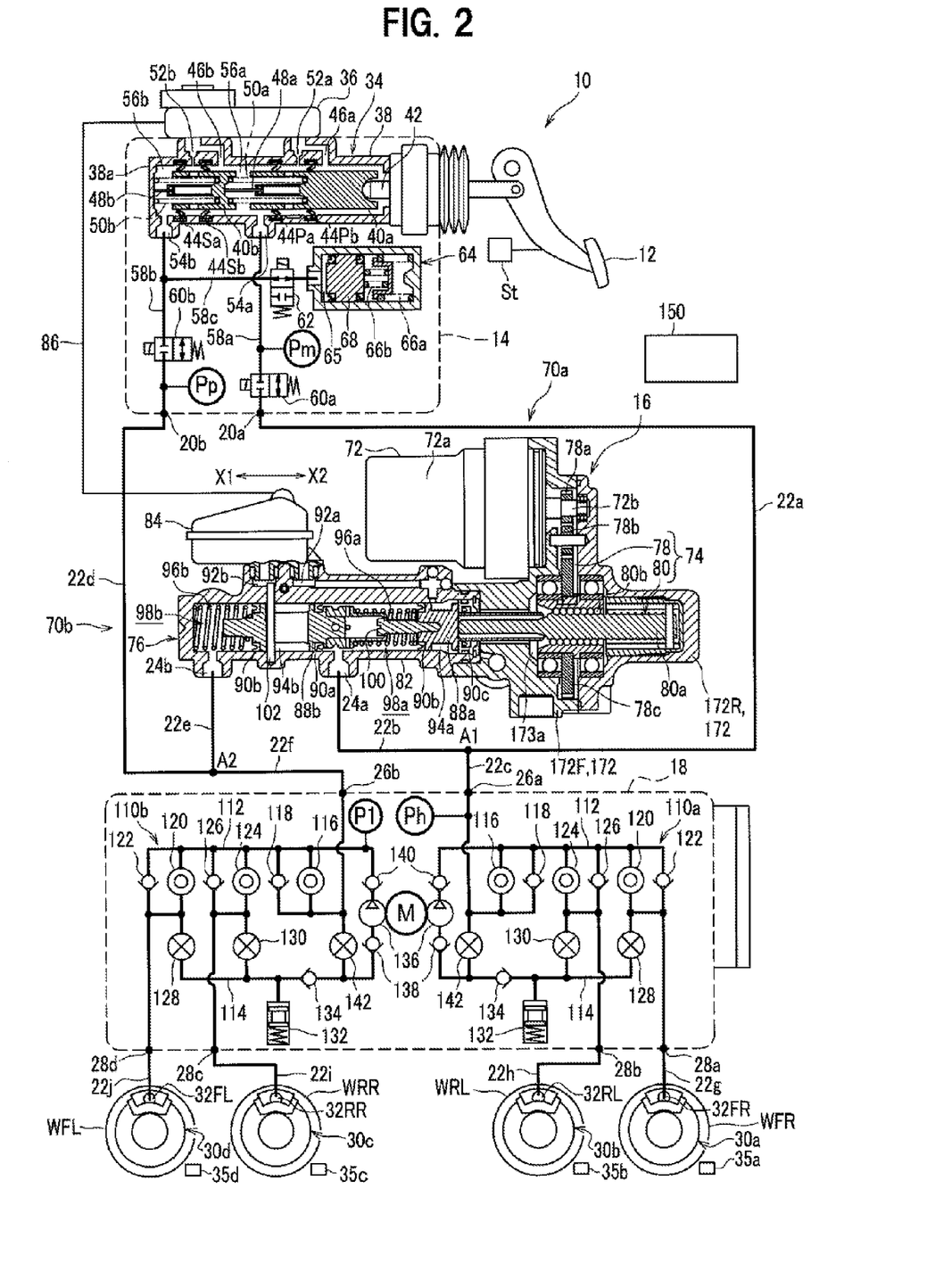
FIG. 2 is a schematic block diagram of a vehicle brake system according to the first embodiment.

As shown in FIG. 2, the vehicle brake system 10 of the first embodiment is configured to include a hydraulic pressure generator (an input device) 14, a pedal stroke sensor St, a motor cylinder device 16, and a vehicle behavior stabilizing device 18 (hereinafter, referred to as a VSA (Vehicle Stability Assist) device 18, VSA; registered trademark). When a brake operation unit such as a brake pedal 12 is operated by a driver, the input device 14 generates a hydraulic pressure (brake hydraulic pressure) in accordance with an input of the operation, to a brake fluid which is a hydraulic fluid. The pedal stroke sensor St detects an operation amount (a stroke) when the brake pedal 12 is operated to be depressed. The motor cylinder device 16 controls a slave hydraulic pressure as the brake hydraulic pressure. The VSA device 18 assists stabilization of a vehicle behavior.

These input device 14, motor cylinder device 16, and VSA device 18 are, for example, connected with one another through conduit paths (hydraulic paths) made of pipe materials such as a hose or a tube, while the input device 14 and the motor cylinder device 16 are electrically connected with each other through an unillustrated harness, as the by-wire brake system.

Among these, the hydraulic paths will be described. With reference to a connection point A1 (slightly below center) in FIG. 2, one connection port 20a of the input device 14 and the connection point A1 are connected through a first piping tube 22a, and an outlet port 24a of the motor cylinder device 16 and the connection point A1 are connected through a second piping tube 22b, and further, an inlet port 26a of the VSA device 18 and the connection point A1 are connected through a third piping tube 22c.

With reference to another connection point A2 in FIG. 2, the other connection port 20b of the input device 14 and the connection point A2 are connected through a fourth piping tube 22d, and another outlet port 24b of the motor cylinder device 16 and the connection point A2 are connected through a fifth piping tube 22e, and further, another inlet port 26b of the VSA device 18 and the connection point A2 are connected through a sixth piping tube 22f.

The VSA device 18 is provided with a plurality of outlet ports 28a to 28d. A first outlet port 28a is connected to a wheel cylinder 32FR of a disc brake mechanism 30a provided on a front right wheel WFR through a seventh piping tube 22g. A second outlet port 28b is connected to a wheel cylinder 32RL of a disc brake mechanism 30b provided on a rear left wheel WRL through an eighth piping tube 22h. A third outlet port 28c is connected to a wheel cylinder 32RR of a disc brake mechanism 30c provided on a rear right wheel WRR through a ninth piping tube 22i. A fourth outlet port 28d is connected to a wheel cylinder 32FL of a disc brake mechanism 30d provided on a front left wheel WFL through a tenth piping tube 22j.

In this case, a brake fluid is supplied to each of the wheel cylinders 32FR, 32RL, 32RR, and 32FL of the disc brake mechanisms 30a to 30d through the piping tubes 22g to 22j connected to each of the outlet ports 28a to 28d. Each of the wheel cylinders 32FR, 32RL, 32RR, and 32FL is actuated upon an increase of the brake hydraulic pressure in each of the wheel cylinders 32FR, 32RL, 32RR, and 32FL, and a friction force against the corresponding wheels (the front right wheel WFR, the rear left wheel WRL, the rear right wheel WRR, and the front left wheel WFL) is increased, and thus the braking force is applied to the corresponding wheels.

Further, each of the front right wheel WFR, the rear left wheel WRL, the rear right wheel WRR, and the front left wheel WFL includes wheel speed sensors 35a, 35b, 35c, 35d for detecting wheel speeds, respectively, and a measurement signal generated by measuring the wheel speed of each of the wheels by each of the wheel speed sensors 35a, 35b, 35c, 35d is inputted into the control unit 150.

The input device 14 includes a tandem-type master cylinder 34 capable of generating the hydraulic pressure in the brake fluid in accordance with the operation of the brake pedal 12 by the driver, and a reservoir (first reservoir 36) attached to the master cylinder 34. In a cylinder tube 38 of the master cylinder 34, two pistons (a secondary piston 40a, a primary piston 40b), which are spaced by a predetermined distance from each other in an axial direction of the cylinder tube 38, are disposed slidably. The secondary piston 40a is disposed in close proximity to the brake pedal 12, and connected to the brake pedal 12 via a push rod 42. Further, the primary piston 40b is disposed further from the brake pedal 12 than the secondary piston 40a.

Further, a pair of cap seals 44Pa, 44Pb which exhibits a ring shape and is in sliding contact with an outer periphery of the primary piston 40b, and a pair of cap seals 44Sa, 44Sb which exhibits a ring shape and is in sliding contact with an outer periphery of the secondary piston 40a, are attached to an inner wall of the cylinder tube 38. Furthermore, one spring member 50a is provided between the secondary piston 40a and the primary piston 40b, and the other spring member 50b is provided between the primary piston 40b and a side end portion 38a on a closed end side of the cylinder tube 38.

Further, a guide rod 48b is extended in a sliding direction of the primary piston 40b from the side end portion 38a of the cylinder tube 38, and the primary piston 40b slides while being guided by the guide rod 48b. Furthermore, a guide rod 48a is extended in a sliding direction of the secondary piston 40a from an end portion of the secondary piston 40a side of the primary piston 40b, and the secondary piston 40a slides while being guided by the guide rod 48a. Then, the secondary piston 40a and the primary piston 40b are arranged in series while being connected by the guide rod 48a. The guide rods 48a, 48b will be described later in detail.

Further, the cylinder tube 38 of the master cylinder 34 is provided with two supply ports (a secondary supply port 46a, a first supply port 46b), two relief ports (a secondary relief port 52a, a first relief port 52b), and two outlet ports 54a, 54b. In this case, the second supply port 46a, the first supply port 46b, and the secondary relief port 52a, the first relief port 52b are provided so as to join together to be in communication with an unillustrated reservoir chamber in the first reservoir 36, respectively. Furthermore, the pair of cap seals 44Sa, 44Sb slidably contacting with the outer periphery of the secondary piston 40a is disposed sandwiching the second relief port 52a in the sliding direction of the secondary piston 40a. Further, the pair of cap seals 44Pa, 44Pb slidably contacting with the outer periphery of the primary piston 40b is disposed sandwiching the first relief port 52b in the sliding direction of the primary piston 40b.

Further, a second pressure chamber 56a and first pressure chamber 56b, which generate a hydraulic pressure in accordance with a depression force applied to the brake pedal 12 by the driver, are provided in the cylinder tube 38 of the master cylinder 34. The second pressure chamber 56a is provided to be in communication with the connection port 20a via a second hydraulic path 58a, and the first pressure chamber 56b is provided to be in communication with the other connection port 20b via a first hydraulic path 58b. The second pressure chamber 56a and the first pressure chamber 56b are sealed liquid-tightly therebetween with the pair of cup seals 44Sa, 44Sb. Further, the brake pedal 12 side of the second pressure chamber 56a is sealed liquid-tightly with the pair of cup seals 44Pa, 44Pb.

The first pressure chamber 56b is configured to generate a hydraulic pressure in accordance with a displacement of the primary piston 40b, and second pressure chamber 56a is configured to generate a hydraulic pressure in accordance with a displacement of the secondary piston 40a. Further, the secondary piston 40a is connected to the brake pedal 12 via the push rod 42, and is displaced in the cylinder tube 38 in accordance with the operation of the brake pedal 12. Furthermore, the primary piston 40b is displaced by a hydraulic pressure generated in the second pressure chamber 56a by the displacement of the secondary piston 40a. In other words, the primary piston 40b is displaced in response to the secondary piston 40a.

Between the master cylinder 34 and the connection port 20a, a pressure sensor Pm is provided on the upstream side of the second hydraulic path 58a, while a second shut-off valve 60a made of a normally open type solenoid valve is provided on the downstream side of the second hydraulic path 58a. The pressure sensor Pm is adapted to measure the hydraulic pressure on the upstream side closer to the master cylinder 34 than the second shut-off valve 60a on the second hydraulic path 58a.

Between the master cylinder 34 and the other connection port 20b, a first shut-off valve 60b made of a normally open type solenoid valve is provided on the upstream side of the first hydraulic path 58b, while a pressure sensor Pp is provided on the downstream side of the first hydraulic path 58b. The pressure sensor Pp is adapted to measure the hydraulic pressure on the downstream side closer to the wheel cylinders 32FR, 32RL, 32RR, and 32FL than the first shut-off valve 60b on the first hydraulic path 58b.

The term "normally open" of the first shut-off valve 60b and the second shut-off valve 60a means that a normal position (a valving element position when not energized) of the valve is in a state of an open position (normally open). Note that, in FIG. 2, the first shut-off valve 60b and the second shut-off valve 60a respectively shows a closed valve state in which a solenoid is energized to actuate an unillustrated valving element.

On the first hydraulic path 58b between the master cylinder 34 and the first shut-off valve 60b, a branch hydraulic path 58c bifurcated from the second hydraulic path 58b is provided, and a third shut-off valve 62 made of a normally closed type solenoid valve and a stroke simulator 64 are connected in series to the branch hydraulic path 58c. The term "normally closed" of the third shut-off valve 62 means that a normal position (a valving element position when not energized) of the valve is in a state of a closed position (normally closed). Note that, in FIG. 2, the third shut-off valve 62 shows an open valve state in which a solenoid is energized to actuate an unillustrated valving element.

The stroke simulator 64 is a device which makes the driver feel as if the braking force is generated in accordance with the depression force by generating a reaction force and a stroke for a depression operation of the brake pedal 12 at the time of by-wire control, and is disposed on the master cylinder 34 side from the first shut-off valve 60b on the first hydraulic path 58b. The stroke simulator 64 is provided with a hydraulic chamber 65 which is in communication with the branch hydraulic path 58c, and is provided so as to be capable of absorbing the brake fluid which is derived from the first pressure chamber 56b of the master cylinder 34 via the hydraulic chamber 65.

The stroke simulator 64 includes a first return spring 66a having a high spring constant, a second return spring 66b having a low spring constant, which are arranged in series with each other, and a simulator piston 68 which is urged by the first and second return springs 66a, 66b. Further, the stroke simulator 64 is provided such that an operation feeling for the brake pedal 12 is equivalent to the operation feeling when depressing a conventional master cylinder 34 by setting an increasing gradient of the pedal reaction force to be low in the former period of depression of the brake pedal 12, and by setting the pedal reaction force to be high in the latter period of depression of the brake pedal 12. In other words, the stroke simulator 64 is configured to generate the reaction force in accordance with the hydraulic pressure of the brake fluid derived from the first pressure chamber 56b, and apply the reaction force to the brake pedal 12 via the master cylinder 34.

The hydraulic paths are roughly divided into a second hydraulic system 70a which connects the second pressure chamber 56a of the master cylinder 34 to the plurality of wheel cylinders 32FR, 32RL, and a first hydraulic system 70b which connects the first pressure chamber 56b of the master cylinder 34 to the plurality of wheel cylinders 32RR, 32FL.

The second hydraulic system 70a is composed of the second hydraulic path 58a which connects the outlet port 54a of the master cylinder 34 (cylinder tube 38) in the input device 14 to the connection port 20a, the piping tubes 22a, 22b which connect the connection port 20a of the input device 14 to the outlet port 24a of the motor cylinder device 16, the piping tube 22b, 22c which connect the outlet port 24a of the motor cylinder device 16 to the inlet port 26a of the VSA device 18, and the piping tubes 22g, 22h which connect the outlet ports 28a, 28b of the VSA device 18 to the wheel cylinders 32FR, 32RL, respectively.

The first hydraulic system 70b has the first hydraulic path 58b which connects the outlet port 54b of the master cylinder 34 (cylinder tube 38) in the input device 14 to the other connection port 20b, the piping tubes 22d, 22e which connect the other connection port 20b of the input device 14 to the outlet port 24b of the motor cylinder device 16, the piping tube 22e, 22f which connect the outlet port 24b of the motor cylinder device 16 to the inlet port 26b of the VSA device 18, and the piping tubes 22i, 22j which connect the outlet ports 28c, 28d of the VSA device 18 to the wheel cylinders 32RR, 32FL, respectively.

The motor cylinder device 16 has a motor (an electric motor 72), an actuator mechanism 74, and a cylinder mechanism 76 which is urged by the actuator mechanism 74.

The actuator mechanism 74 is provided on an output shaft 72b side of the electric motor 72, and has a gear mechanism (deceleration mechanism) 78 and a ball screw structure 80. The gear mechanism 78 transmits a rotational driving force of the electric motor 72 by meshing a plurality of gears, and the ball screw structure 80 includes balls 80b and a ball screw shaft 80a which moves back and forth in the axial direction by being transmitted the rotational driving force via the gear mechanism 78. In the first embodiment, the ball screw structure 80 is housed in a mechanism housing portion 173a of an actuator housing 172 together with the gear mechanism 78.

The cylinder mechanism 76 has a substantially cylindrical cylinder body 82 and a second reservoir 84 attached to the cylinder body 82. The second reservoir 84 is connected to the first reservoir 36 attached to the master cylinder 34 of the input device 14 via a piping tube 86, and is provided such that the brake fluid stored in the first reservoir 36 is supplied to the second reservoir 84 via the piping tube 86. Note that, the piping tube 86 may be provided with a tank which stores the brake fluid. The open end portion of the cylinder body 82 having a substantially cylindrical shape is fitted into the actuator housing 172 composed of a housing body 172F and a housing cover 172R, and thus the cylinder body 82 and the actuator housing 172 are connected with each other, to construct the motor cylinder device 16.

In the cylinder body 82, a second slave piston 88a and a first slave piston 88b, which are separated by a predetermined distance in an axial direction of the cylinder body 82, are arranged slidably. The second slave piston 88a is disposed in close proximity to the ball screw structure 80 side, to come into contact with one end portion of the ball screw shaft 80a, and is displaced integrally with the ball screw shaft 80a in a direction of an arrow X1 or X2. Further, the first slave piston 88b is disposed further from the ball screw structure 80 side than the second slave piston 88a.

The electric motor 72 according to the first embodiment is configured to be covered with a motor casing 72a which is formed separately from the cylinder body 82, and is disposed such that the output shaft 72b is substantially in parallel with the sliding direction (axial direction) of the second slave piston 88a and first slave piston 88b. Further, it is configured such that the rotational driving of the output shaft 72b is transmitted to the ball screw structure 80 via the gear mechanism 78.

The gear mechanism 78 is, for example, composed of three gears, which are a first gear 78a, a third gear 78c, and a second gear 78b. The first gear is attached to the output shaft 72b of the electric motor 72, and the third gear 78c rotates the balls 80b, which make the ball screw shaft 80a move back and forth in the axial direction, around the axis of the ball screw shaft 80a, and further the second gear 78b transmits a rotation of the first gear 78a to the third gear 78c. Furthermore, the third gear 78c rotates around the axis of the ball screw shaft 80a.

By the structure described above, the actuator mechanism 74 according to the first embodiment converts the rotational driving force of the output shaft 72b of the electric motor 72 into a reciprocating driving force (linear driving force) of the ball screw shaft 80a.

On the outer peripheral surface of the first slave piston 88b, via annular step portions, each of a pair of slave cup seals 90a, 90b is mounted. Between the pair of slave cup seals 90a, 90b, a first back chamber 94b, which is in communication with a reservoir port 92b to be described later, is formed. Note that, between the second slave piston 88a and the first slave piston 88b, a second return spring 96a is provided, and between the side end portion of the cylinder body 82 and the first slave piston 88b, a first return spring 96b is provided.

An annular guide piston 90c, which liquid-tightly seals a gap between the mechanism housing portion 173a and the outer peripheral surface of the second slave piston 88a, and guides the second slave piston 88a movably in the axial direction, is provided behind the second slave piston 88a so as to close the cylinder body 82 as a seal member. A gap between the second slave piston 88a and the guide piston 90c is preferably configured to be liquid-tight by mounting an unillustrated slave cup seal on the inner peripheral surface of the guide piston 90c into which the second slave piston 88a penetrates. Further, on the outer peripheral surface of the front portion of the second slave piston 88a, a slave cup seal 90b is mounted via an annular step portion. With this configuration, the brake fluid filled in the cylinder body 82 is sealed in the cylinder body 82 by the guide piston 90c, and does not flow into the side of the actuator housing 172. Note that, between the guide piston 90c and the slave cup seal 90b, a second back chamber 94a, which is in communication with a reservoir port 92a to be described later, is formed.

In the cylinder body 82 of the cylinder mechanism 76, two reservoir ports 92a, 92b and two outlet ports 24a, 24b are provided. In this case, the reservoir port 92a (92b) is provided so as to be in communication with an unillustrated reservoir chamber in the second reservoir 84.

Further, in the cylinder body 82, the second hydraulic chamber 98a and the first hydraulic chamber 98b are provided. The second hydraulic chamber 98a controls a brake hydraulic pressure which is outputted from the outlet port 24a to the wheel cylinders 32FR, 32RL side, and the first hydraulic chamber 98b controls a brake hydraulic pressure which is outputted from the other outlet port 24b to the wheel cylinders 32RR, 32FL side.

With this configuration, the second back chamber 94a, the first back chamber 94b, the second hydraulic chamber 98a, and the first hydraulic chamber 98b, in which the brake fluid is sealed, are sealing portions of the brake fluid in the cylinder body 82, and are partitioned liquid-tightly (hermetically) from the mechanism housing portion 173a of the actuator housing 172 by the guide piston 90c which functions as a seal member. Note that, a method of attaching the guide piston 90c to the cylinder body 82 is not limited thereto, and for example, it may be configured to be attached by an unillustrated circlip.

Between the second slave piston 88a and the first slave piston 88b, a regulation unit 100 for regulating maximum strokes (maximum displacement distances) and minimum strokes (minimum displacement distances) of the second slave piston 88a and the first slave piston 88b is provided. Further, on the first slave piston 88b, a stopper pin 102 for regulating a sliding range of the first slave piston 88b to prevent over-return to the second slave piston 88a side is provided. With this configuration, when one system fails, a failure in the other system is prevented, particularly during backup time when braking by the master cylinder 34.

The VSA device 18 is composed of known components, and has a second brake system 110a for controlling the second hydraulic system 70a connected to the disc brake mechanisms 30a, 30b (the wheel cylinders 32FR, 32RL) of the front right wheel WFR and the rear left wheel WRL, and a first brake system 110b for controlling the first hydraulic system 70b connected to the disc brake mechanisms 30c, 30d (the wheel cylinders 32RR, 32FL) of the rear right wheel WRR and the front left wheel WFL. Here, the second brake system 110a may be a hydraulic system connected to the disc brake mechanisms provided on the front left wheel WFL and the front right wheel WFR, and the first brake system 110b may be a hydraulic system connected to the disc brake mechanisms provided on the rear right wheel WRR and the rear left wheel WRL. Further, the second brake system 110a may be a hydraulic system connected to the disc brake mechanisms provided on the front right wheel WFR and the rear right wheel WRR on one side of the vehicle body, and the first brake system 110b may be a hydraulic system connected to the disc brake mechanisms provided on the front left wheel WFL and the rear left wheel WRL on the other side of the vehicle body.

Since the second brake system 110a and the first brake system 110b have the same structures with each other, those corresponding to each other in the second brake system 110a and in the first brake system 110b are given the same reference numerals, while descriptions will be focused on the second brake system 110a, and descriptions of the first brake system 110b will be appended in parentheses.

The second brake system 110a (the first brake system 110b) has common conduit paths (a first common hydraulic path 112 and a second common hydraulic path 114), which are common to the wheel cylinders 32FR, 32RL (32RR, 32FL). Among these, the first common hydraulic path 112 is a supply path for supplying the brake hydraulic pressure to the wheel cylinders 32FR, 32RL (32RR, 32FL). The VSA device 18 includes a regulator valve 116, a first check valve 118, a first inlet valve 120, a second check valve 122, a second inlet valve 124, and a third check valve 126. The regulator valve 116 is made of a normally open type solenoid valve disposed between an inlet port 26a (26b) and the first common hydraulic path 112. The first check valve 118 is disposed in parallel with the regulator valve 116, and allows the brake fluid to flow from the inlet port 26a (26b) side to the side of the first common hydraulic path 112 (prevents the brake fluid from flowing to the inlet port 26a (26b) side from the side of the first common hydraulic path 112). The first inlet valve 120 is made of a normally open type solenoid valve disposed between the first common hydraulic path 112 and the first outlet port 28a (fourth outlet port 28d). The second check valve 122 is disposed in parallel with the first inlet valve 120, and allows the brake fluid to flow from the first outlet port 28a (fourth outlet port 28d) side to the side of the first common hydraulic path 112 (prevents the brake fluid from flowing to the first outlet port 28a (fourth outlet port 28d) side from the side of the first common hydraulic path 112). The second inlet valve 124 is made of a normally open type solenoid valve disposed between the first common hydraulic path 112 and the second outlet port 28b (third outlet port 28c). The third check valve 126 is disposed in parallel with the second inlet valve 124, and allows the brake fluid to flow from the second outlet port 28b (third outlet port 28c) side to the side of the first common hydraulic path 112 (prevents the brake fluid from flowing to the second outlet port 28b (third outlet port 28c) side from the side of the first common hydraulic path 112).

Note that, the VSA device 18 of the first embodiment is provided with a pressure sensor P1 for measuring the brake hydraulic pressure in the first common hydraulic path 112, and a measurement signal measured by the pressure sensor P1 is inputted into the control unit 150.

The first inlet valve 120 and the second inlet valve 124 are opening/closing means for opening and closing the conduit path (first common hydraulic path 112) through which the brake hydraulic pressure is supplied to the wheel cylinders 32FR, 32RL, 32RR, 32FL. When the first inlet valve 120 is closed, supply of the brake hydraulic pressure from the first common hydraulic path 112 to the wheel cylinders 32FR, 32RL is shut off. Further, when the second inlet valve 124 is closed, supply of the brake hydraulic pressure from the first common hydraulic path 112 to the wheel cylinders 32RR, 32FL is shut off.

Further, the VSA 18 includes a first outlet valve 128, a second outlet valve 130, a reservoir 132, a fourth check valve 134, a pump 136, an intake valve 138, a discharge valve 140, a motor M, and a suction valve 142. The first outlet valve 128 is made of a normally closed type solenoid valve disposed between the first outlet port 28a (fourth outlet port 28d) and the second common hydraulic path 114. The second outlet valve 130 is made of a normally closed type solenoid valve disposed between the second outlet port 28b (third outlet port 28c) and the second common hydraulic path 114. The reservoir 132 is connected to the second common hydraulic path 114. The fourth check valve 134 is disposed between the first common hydraulic path 112 and the second common hydraulic path 114, and allows the brake fluid to flow from the second common hydraulic path 114 side to the first common hydraulic path 112 side (prevents the brake fluid from flowing to the second common hydraulic path 114 side from the first common hydraulic path 112 side). The pump 136 is disposed between the fourth check valve 134 and the first common hydraulic path 112, and supplies the brake fluid to the first common hydraulic path 112 side from the second common hydraulic path 114 side. The intake valve 138 and the discharge valve 140 are disposed respectively before and after the pump 136 driven by the motor M. The suction valve 142 is made of a normally closed type solenoid valve disposed between the second common hydraulic path 114 and the inlet port 26a (26b).

Note that, in the second brake system 110a, on a conduit path (hydraulic path) in close proximity to the inlet port 26a, a pressure sensor Ph for measuring the brake hydraulic pressure which is outputted from the output port 24a of the motor cylinder device 16 and controlled through the second hydraulic chamber 98a of the motor cylinder device 16, is provided. Measurement signals measured by the respective pressure sensors Pm, Pp, and Ph are inputted into the control unit 150. Further, the VSA device 18 is capable of performing ABS (Antilock Brake System) control, in addition to VSA control. Furthermore, in place of the VSA device 18, an ABS device equipped with only ABS function may be configured to be connected. The vehicle brake system 10 according to the first embodiment is basically configured as described above, and the operation and effect will be described in the following.

In a normal state where the vehicle brake system 10 works properly, the first shutoff valve 60b and the second shutoff valve 60a made of normally open type solenoid valves are in the closed valve state by energization, and the third shutoff valve 62 made of a normally closed type solenoid valve is in the open valve state by energization. Therefore, since the second hydraulic system 70a and the first hydraulic system 70b are shut off by the second shutoff valve 60a and the first shutoff valve 60b, the hydraulic pressure generated by the master cylinder 34 of the input device 14 is not transmitted to the wheel cylinders 32FR, 32RL, 32RR, 32FL of the disc brake mechanisms 30a to 30d.

In this case, the hydraulic pressure generated in the first pressure chamber 56b of the master cylinder 34 is transmitted to the hydraulic chamber 65 of the stroke simulator 64 via the branch hydraulic path 58c and the third shutoff valve 62 in the open valve state. By the hydraulic pressure supplied to the hydraulic chamber 65, the simulator piston 68 is displaced against the spring force of the first and second return springs 66a, 66b, and thus a stroke of the brake pedal 12 is allowed while a pseudo-pedal reaction force is generated and applied to the brake pedal 12. As a consequence, a brake feeling which is not uncomfortable for the driver is obtained.

In such a system state, upon detecting the depression of the brake pedal 12 by the driver, the control unit 150 determines the braking and drives the electric motor 72 of the motor cylinder device 16 to urge the actuator mechanism 74, and displaces the second slave piston 88a and the first slave piston 88b toward the direction of the arrow X1 in FIG. 2, against the spring forces of the second return spring 96a and the first return spring 96b. By the displacement of the second slave piston 88a and the first slave piston 88b, the brake hydraulic pressure in the second hydraulic chamber 98a and the brake hydraulic pressure in the first hydraulic chamber 98b are pressurized so as to be balanced with each other, and thus an intended brake hydraulic pressure is generated.

Specifically, the control unit 150 calculates a depression operation amount (hereinafter, appropriately referred to as "brake operation amount") of the brake pedal 12 in accordance with a measured value of the pedal stroke sensor St, and sets a brake hydraulic pressure which is a target in consideration of a regenerative braking force Pmot on the basis of the brake operation amount, and then generates the brake hydraulic pressure which is set, in the motor cylinder device 16.

The control unit 150 of the first embodiment is, for example, composed of a micro computer constituted by a CPU (Central Processing Unit), a ROM (Read Only Memory), a RAM (Random Access Memory), and the like, and peripheral devices, neither of which is shown. Then, the control unit 150 is configured to perform by the CPU a program stored in the ROM in advance, and control the vehicle brake system 10. Further, an electrical signal in the first embodiment is, for example, a control signal for controlling the electric motor 72, or power to drive the electric motor 72.

Further, an operation amount measurement unit for measuring the depression operation amount (brake operation amount) of the brake pedal 12 is not limited to the stroke sensor St, but may be a sensor capable of measuring the depression operation amount of the brake pedal 12. It may be, for example, configured that the hydraulic pressure measured by the pressure sensor Pm as the operation amount measurement unit is converted to the depression operation amount of the brake pedal 12, or the depression operation amount (brake operation amount) of the brake pedal 12 is measured by an unillustrated depression force sensor.

The brake hydraulic pressure in the second hydraulic chamber 98a and the first hydraulic chamber 98b of the motor cylinder device 16 is transmitted to the wheel cylinders 32FR, 32RL, 32RR, 32FL of the disc brake mechanisms 30a to 30d via the first and second inlet valves 120, 124 in the open valve state of the VSA device 18, and an intended brake force is applied to each of the wheels (the front right wheel WFR, the rear left wheel WRL, the rear right wheel WRR, and the front left wheel WFL) by the operations of the wheel cylinders 32FR, 32RL, 32RR, 32FL.

In other words, in the vehicle brake system 10 according to the first embodiment, in a normal state where the motor cylinder device 16 which functions as a power hydraulic pressure source, the control unit 150 which performs by-wire control, and the like, are operational, the brake system of so-called brake-by-wire type is active. The brake system of brake-by-wire type actuates the disc brake mechanisms 30a to 30d by the hydraulic pressure generated by the motor cylinder device 16, in a state where the communication between the master cylinder 34 for generating the hydraulic pressure via the brake pedal 12 depressed by the driver and the disc brake mechanisms 30a to 30d (wheel cylinders 32FR, 32RL, 32RR, 32FL) for braking each of the wheels is shut off by the second shutoff valve 60a and the first shutoff valve 60b.

On the other hand, in an abnormal state where the motor cylinder device 16 and the like are inoperative, the brake system of so-called conventional hydraulic type is active. The conventional brake system actuates the disc brake mechanisms 30a to 30d (wheel cylinders 32FR, 32RL, 32RR, 32FL) by transmitting the hydraulic pressure generated by the master cylinder device 34 to the disc brake mechanisms 30a to 30d (wheel cylinders 32FR, 32RL, 32RR, 32FL) as the brake hydraulic pressure, while the second shutoff valve 60a and the first shutoff valve 60b are respectively in the open valve states and the third shutoff valve 62 is in the closed valve state.

In the vehicle brake system 10 configured as described above, when the driver operates to depress the brake pedal 12, the brake hydraulic pressure generated in the motor cylinder 16 is supplied to the wheel cylinders 32FR, 32RL, 32RR, 32FL of the respective wheels (the front right wheel WFR, the rear left wheel WRL, the rear right wheel WRR, and the front left wheel WFL) via the VSA device 18. Then, by the brake hydraulic pressure supplied to the wheel cylinders 32FR, 32RL, 32RR, 32FL, a caliper pressure is generated in each of the disc brake mechanisms 30a, 30b, 30c, 30d, and the braking force is applied to the respective wheels (the front right wheel WFR, the rear left wheel WRL, the rear right wheel WRR, and the front left wheel WFL). The vehicle 1 (see FIG. 1) stops and becomes in a stationary state by the braking force being applied to the respective wheels.

Further, when the pump 136 of the VSA device 18 is driven to supply the brake fluid to the first common hydraulic path 112 side from the second common hydraulic path 114 side, the brake hydraulic pressure in the first common hydraulic path 112 is boosted, and the brake hydraulic pressure supplied to the wheel cylinders 32FR, 32RL, 32RR, 32FL is boosted. And thereby the caliper pressure generated in the disc brake mechanisms 30a, 30b, 30c, 30d is increased, and braking force applied to the vehicle 1 is increased. Therefore, in the first embodiment, the pump 136 functions as a booster unit for increasing the braking force applied to the vehicle 1.

Further, when the braking force is applied to the vehicle 1 by the depression operation of the brake pedal 12 and the vehicle speed of the vehicle 1 is lower than a predetermined speed threshold value set in advance, the control unit 150 of the first embodiment determines that the vehicle 1 is stationary, and operates a braking force holding function (brake hold function) by controlling the vehicle brake system 10. Note that, the predetermined speed threshold value for the control unit 150 to determine that the vehicle 1 is stationary is preferably set as appropriate.

Figure 3A:
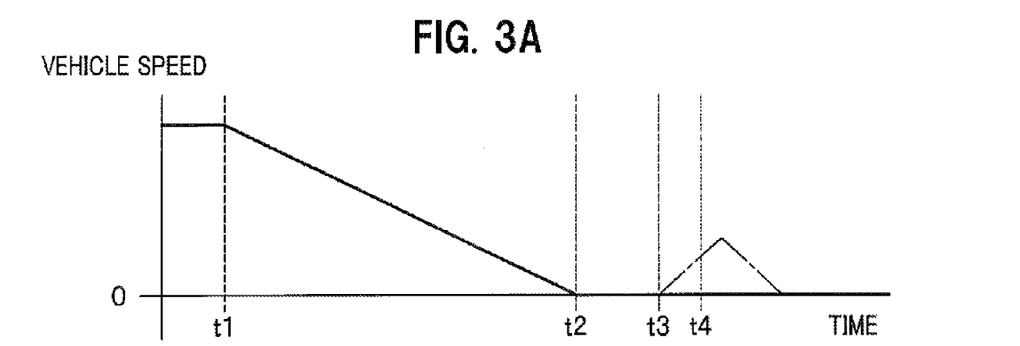
FIG. 3A is a diagram showing a state where a brake hold function is in operation in the first embodiment, and showing a variation of a vehicle speed.
Figure 3B:
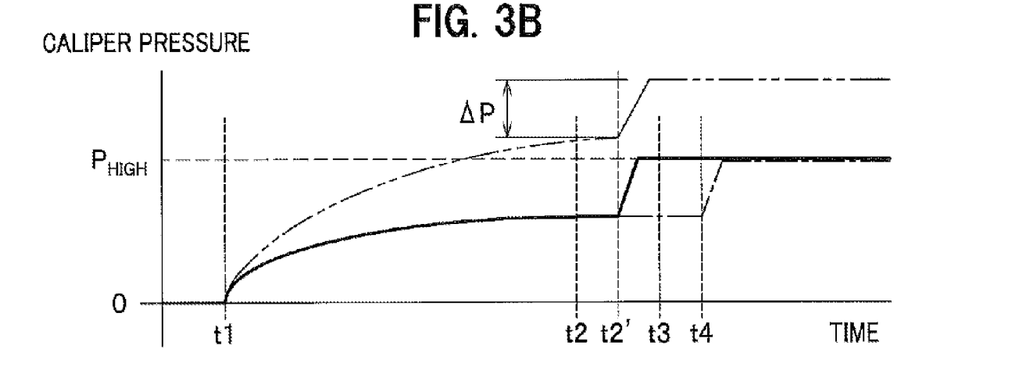
FIG. 3B is a diagram showing a state where a brake hold function is in operation in the first embodiment, and showing a variation of a caliper pressure.
Figure 3C:
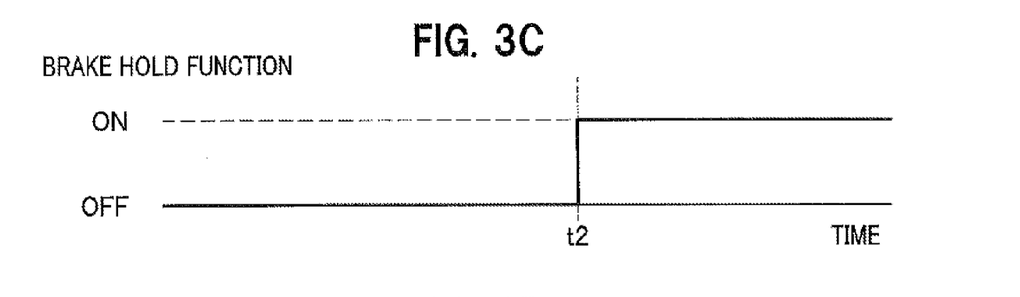
FIG. 3C is a diagram showing a state where a brake hold function is in operation in the first embodiment, and showing a time course of an operating state (ON, OFF) of the brake hold function.
Figure 3D:
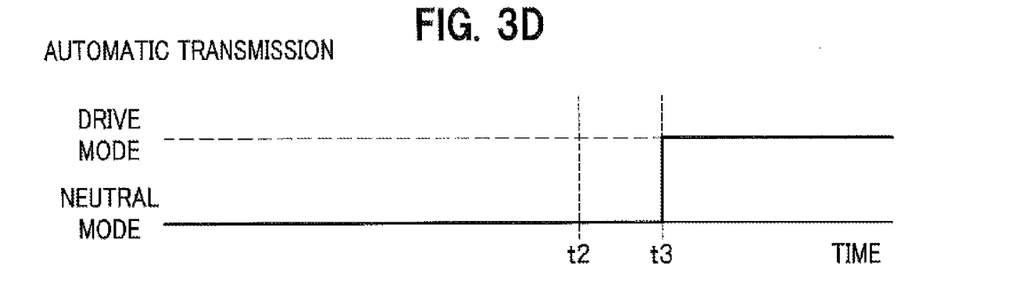
FIG. 3D is a diagram showing a state where a brake hold function is in operation in the first embodiment, and showing a time course of a mode (drive mode, neutral mode) of an automatic transmission.

FIGS. 3A to 3D are diagrams showing states where a brake hold function is in operation in the first embodiment. Incidentally, the vertical axis in FIG. 3A indicates the vehicle speed, and the vertical axis in FIG. 3B indicates the caliper pressure, and further the horizontal axes in FIGS. 3A, 3B indicate the time. Further, FIG. 3C shows a time course of an operating state (ON, OFF) of the brake hold function, and FIG. 3D shows a time course of the mode (drive mode, neutral mode) of the automatic transmission.

The brake hold function which operates in the vehicle brake system 10 (see FIG. 2) of the first embodiment is a function of maintaining a state in which the brake hydraulic pressure is supplied to the wheel cylinders 32FR, 32RL, 32RR, 32FL (see FIG. 2) of the respective wheels (the front right wheel WFR, the rear left wheel WRL, the rear right wheel WRR, and the front left wheel WFL), when the vehicle speed of the vehicle 1 (see FIG. 1) is lower than the predetermined speed threshold value set in advance. By the brake hold function being operated, for example, when the driver releases his/her foot from the brake pedal 12 (see FIG. 2) and the brake pedal 12 is released, the state in which the braking force is applied to the respective wheels is maintained and a start of movement of the vehicle 1 is suppressed.

As shown in FIG. 3A, when the driver operates to depress the brake pedal 12 (see FIG. 2) at the time t1, the control unit 150 (see FIG. 2) generates an initial brake hydraulic pressure through the motor cylinder 16 (see FIG. 2) and supplies the initial brake hydraulic pressure to the wheel cylinders 32FR, 32RL, 32RR, 32FL. Hereby, the caliper pressure is applied to operate the disc brake mechanisms 30a, 30b, 30c, 30d of the respective wheels as shown in FIG. 3B, and the vehicle speed of the vehicle 1 (see FIG. 1) is reduced as shown in FIG. 3A.

When the vehicle speed of the vehicle 1 (see FIG. 1), which is calculated on the basis of the wheel speeds of the respective wheels measured by the wheel speed sensors 35a, 35b, 35c, 35d (see FIG. 2), becomes lower than the predetermined speed threshold value at the time t2, the control unit 150 (see FIG. 2) of the first embodiment determines that the vehicle 1 (see FIG. 1) is stationary, and operates the brake hold function (turns on the brake hold function) as shown in FIG. 3C. Specifically, when the control unit 150 determines that the vehicle 1 is stationary at the time t2, it closes the normally open type regulator valve 116 (see FIG. 2) included in the VSA device 18 (see FIG. 2). Hereby, the brake hydraulic pressure generated in the motor cylinder device 16 (see FIG. 2) is sealed in the VSA device 18 (the first common hydraulic path 112, the second common hydraulic path 114), and the state in which the brake hydraulic pressure is supplied to the wheel cylinders 32FR, 32RL, 32RR, 32FL (see FIG. 2) is maintained. Then, the vehicle 1 is maintained in the stationary state by operating the brake hold function.

In the first embodiment, the state in which supply of the brake hydraulic pressure to the wheel cylinders 32FR, 32RL, 32RR, 32FL (see FIG. 2) is maintained is achieved by closing the regulator valve 116 (see FIG. 2), and the caliper pressure is thereby maintained in the disc brake mechanisms 30a, 30b, 30c, 30d (see FIG. 2) of the respective wheels. This condition is referred to as a state (an ON state) in which the brake hold mechanism operates.

When an unillustrated accelerator pedal is operated to be depressed by the driver, the control unit 150 (see FIG. 2) determines that a condition for stopping the brake hold function is established, and opens the regulator valve 116 (see FIG. 2). The brake hydraulic pressure sealed in the VSA device 18 (the first common hydraulic path 112, the second common hydraulic path 114) is released from the VSA device 18 via the inlet port 26a (see FIG. 2), and supply of the brake hydraulic pressure to the wheel cylinders 32FR, 32RL, 32RR, 32FL (see FIG. 2) is stopped, and thus the caliper pressure generated in the disc brake mechanisms 30a, 30b, 30c, 30d (see FIG. 2) of the respective wheels is eliminated. In the first embodiment, the state in which supply of the brake hydraulic pressure to the wheel cylinders 32FR, 32RL, 32RR, 32FL is stopped, and the caliper pressure in the disc brake mechanisms 30a, 30b, 30c, 30d of the respective wheels is reduced, is referred to as a state (an OFF state) in which the brake hold mechanism is stopped.

In this manner, when the vehicle 1 (see FIG. 1) is stationary, the control unit 150 (see FIG. 2) of the first embodiment closes the regulator valve 116 (see FIG. 2) of the VSA device 18, and operates (turns on) the brake hold function. Further, the control unit 150 may be configured to operate an unillustrated electric parking brake to apply the braking force to the vehicle 1 and switch the brake hold function to the electric parking brake when a predetermined time elapses after closing of the regulator valve 116. At this time, the predetermined time until the control unit 150 operates the electric parking brake after closing the regulator valve 116 is set in advance. The predetermined time is, for example, set to a time until the caliper pressure generated in the disc brake mechanisms 30a, 30b, 30c, 30d of the respective wheels is reduced after the brake fluid leaks from the closed regulator valve 116, that is, a time capable of holding the caliper pressure by the regulator valve 116.

Further, as shown in FIG. 1, the vehicle 1 according to the first embodiment includes the automatic transmission 3 as the transmission. When the automatic transmission 3 is set in the driving mode such as the drive mode (forward drive mode) and the reverse mode (rearward drive mode), a creep force is applied to the vehicle 1. Therefore, when the vehicle 1 is stopped in a state where the automatic transmission 3 is set in the drive mode, the braking force applied to the respective wheels (the right front wheel WFR, the left front wheel WFL, a left rear wheel WRL, a right rear wheel WRR) can suppress a forward movement of the vehicle 1 due to the creep force.

In contrast, when the automatic transmission 3 (see FIG. 1) is set in the neutral mode (non-driving mode), the creep force is not applied to the vehicle 1 (see FIG. 1). Therefore, when the automatic transmission 3 is set in the neutral mode, the vehicle 1 is stopped to be in the stationary state by the braking force smaller than that in a case where the automatic transmission 3 is set in the drive mode. For example, when the vehicle 1 is stopped in a state where the automatic transmission 3 is set in the neutral mode, and the brake hold function operates at the time t2, if the creep force is applied to the vehicle 1 by shifting the automatic transmission 3 into the drive mode at the time t3 after the time t2 as shown in FIG. 3D, the vehicle speed is increased by the creep force and the vehicle 1 starts moving as indicated by an one-dot chain line in FIG. 3A in some cases.

When the brake hold function operates, the control unit 150 (see FIG. 1) of the first embodiment calculates the vehicle speed of the vehicle 1 (see FIG. 1) on the basis of the wheel speeds detected by the wheel speed sensors 35a, 35b, 35c, 35d (see FIG. 2). When the control unit 150 determines that the vehicle speed of the vehicle 1 is larger than a predetermined value at the time t4 shown in FIG. 3A, it controls the VSA 18 (see FIG. 2) so that the caliper pressure is increased. Specifically, the control unit 150 determines that the vehicle 1 has started moving when the vehicle speed of the vehicle 1 is larger than the predetermined value, and it drives the pump 136 (see FIG. 2) of the VSA device 18 to supply the brake fluid to the first common hydraulic path 112 (see FIG. 2) side from the second common hydraulic path 114 (FIG. 2) side, and increases the brake hydraulic pressure in the first common hydraulic path 112 at the time t4. As a result, the brake hydraulic pressure supplied to the wheel cylinders 32FR, 32RL, 32RR, 32FL (see FIG. 2) of the respective wheels (the front right wheel WFR, the rear left wheel WRL, the rear right wheel WRR, and the front left wheel WFL) is increased. Then, the caliper pressure in the disc brake mechanisms 30a, 30b, 30c, 30d (see FIG. 2) is increased from the time t4 as indicated by an one-dot chain line in FIG. 3B, and the braking force applied to the respective wheels is increased, and thus the vehicle 1 is stopped again to be in the stationary state.

In other words, if the automatic transmission 3 (see FIG. 3) is shifted to the drive mode from the neutral mode after the time t2 when the brake hold function operates, the vehicle 1 (see FIG. 1) starts moving for a moment and is stopped, and thereby the driver feels a sense of discomfort. Therefore, the vehicle brake system 10 (see FIG. 1) of the first embodiment is configured to reduce the sense of discomfort felt by the driver, when the mode of the automatic transmission 3 is shifted during operation of the brake hold function.

When the control unit 150 (see FIG. 1) of the first embodiment determines that the vehicle 1 (see FIG. 1) is stationary at the time t2, and operates the brake hold function (that is, when closing the regulator valve 116 of the VSA device 18), it obtains the mode of the automatic transmission 3 (see FIG. 1). When the mode of the automatic transmission 3 is the neutral mode (non-driving mode), the control unit 150 drives the pump 136 (see FIG. 2) at the time t2' after the regulator valve 116 (see FIG. 2) of the VSA device 18 is closed. Hereby, the brake fluid is supplied to the first common hydraulic path 112 (see FIG. 2) from the second common hydraulic path 114 (see FIG. 2), and the brake hydraulic pressure in the first common hydraulic path 112 is increased. When the brake hydraulic pressure in the first common hydraulic path 112 is increased, the caliper pressure of the disc brake mechanisms 30a, 30b, 30c, 30d (see FIG. 2) is increased as indicated by a solid line in FIG. 3B, and the braking force applied to the vehicle 1 is increased.

Note that, if the regulator valve 116 (see FIG. 2) is configured to include a sensor (not shown) for detecting a valve opening degree, the control unit 150 (see FIG. 2) can detect that the regulator valve 116 is closed at the time t2', thereby driving the pump 136 (see FIG. 2). Further, the control unit 150 may be configured not to detect the opening of the regulator valve 116, but to drive the pump 136 at the time t2 when it determines that the vehicle 1 (see FIG. 1) is stationary.

At this time, if the initial caliper pressure generated in the disc brake mechanisms 30a, 30b, 30c, 30d (see FIG. 2) is lower than a predetermined pressure $P_{HIGH}$ indicated in FIG. 3B, the control unit 150 (see FIG. 2) drives the pump 136 (see FIG. 2) to increase the initial caliper pressure. The control unit then stops the pump 136 when the caliper pressure is increased to the predetermined pressure $P_{HIGH}$, which may also be referred to herein as an enhanced pressure level.

Note that, the control unit 150 shown in FIG. 2 may be configured to determine whether or not the caliper pressure is increased to the predetermined pressure $P_{HIGH}$ on the basis of the brake hydraulic pressure in the first common hydraulic path 112, the brake hydraulic pressure being calculated on the basis of the measurement signal inputted from the pressure sensor P1 included in the VSA device 18. For example, if a map showing a relationship between the caliper pressure and the brake hydraulic pressure in the first common hydraulic path 112 is set in advance and is stored in an unillustrated storage unit of the control unit 150, the control unit 150 can calculate the caliper pressure on the basis of the brake hydraulic pressure in the first common hydraulic path 112 with reference to the map. The control unit 150 stops the pump 136 when it determines that the caliper pressure calculated in this manner is increased to the predetermined pressure $P_{HIGH}$. As a result, the braking force applied to the vehicle 1 (see FIG. 1) is increased.

Further, the caliper pressure (predetermined pressure $P_{HIGH}$) when the control unit 150 stops the pump 136 may be a pressure through which a braking force (defined braking force in the first embodiment), that is capable of stopping the vehicle 1 (see FIG. 1) against the creep force generated when the automatic transmission 3 is set in the drive mode, is applied to the respective wheels. Such a predetermined pressure $P_{HIGH}$ is preferably set in advance by experimental measurement or the like. In other words, according to the vehicle brake system 10 of the first embodiment, if the automatic transmission 3 is in the neutral mode when the brake hold function operates, the braking force applied to the vehicle 1 is increased up to and held at the defined braking force, when the braking force applied to the vehicle 1 is smaller than the defined braking force (the braking force applied to the vehicle 1 when the caliper pressure is the predetermined pressure $P_{HIGH}$) set in advance.

Note that, when the control unit 150 operates the brake hold function, if the automatic transmission 3 (see FIG. 1) is in the neutral mode, the control unit 150 may be configured to increase the braking force by driving the pump 136 (see FIG. 2) without determining whether or not the braking force applied to the vehicle 1 (see FIG. 1) is smaller than the defined braking force, that is, without determining whether or not the caliper pressure is lower than the predetermined pressure $P_{HIGH}$. For example, as indicated by a two-dot chain line in FIG. 3B, the control unit 150 may be configured to increase the caliper pressure (the braking force) by driving the pump 136 even if the caliper pressure is higher than the predetermined pressure $P_{HIGH}$ at the time t2 when the control unit 150 operates the brake hold function. In this case, as indicated by the two-dot chain line in FIG. 3B, the control unit 150 may be, for example, configured to stop the pump 136 when the caliper pressure is increased by a predetermined differential pressure $\Delta P$. Such a predetermined differential pressure $\Delta P$ may be, for example, a differential pressure for increasing the braking force so as to suppress the start of movement of the vehicle 1 due to the creep force generated when the automatic transmission 3 is shifted to the drive mode from the neutral mode. Note that, if the caliper pressure exceeds the maximum value of the caliper pressure when the caliper pressure is increased by the differential pressure $\Delta P$, the control unit 150 may be configured to increase the caliper pressure to the maximum value.

In this manner, according to the vehicle brake system 10 of the first embodiment, if the automatic transmission 3 (see FIG. 1) is set in the neutral mode (non-driving mode) when the vehicle 1 (see FIG. 1) is stationary and the brake hold function operates, the caliper pressure generated in the disc brake mechanisms 30a, 30b, 30c, 30d (see FIG. 2) is increased to the predetermined pressure $P_{HIGH}$. When the caliper pressure is increased to the predetermined pressure $P_{HIGH}$, the braking force applied to the vehicle 1 is increased, to suppress the forward movement of the vehicle 1 due to the creep force generated when the automatic transmission 3 is set in the drive mode. Therefore, even if the automatic transmission 3 is shifted to the drive mode from the neutral mode during operation of the brake hold function, the vehicle 1 does not start moving.

As a result, when the automatic transmission 3 (see FIG. 1) is shifted to the drive mode from the neutral mode during operation of the brake hold function, the vehicle 1 (see FIG. 1) is suppressed from starting moving for a moment, and the sense of discomfort felt by the driver is reduced.

Figure 4:
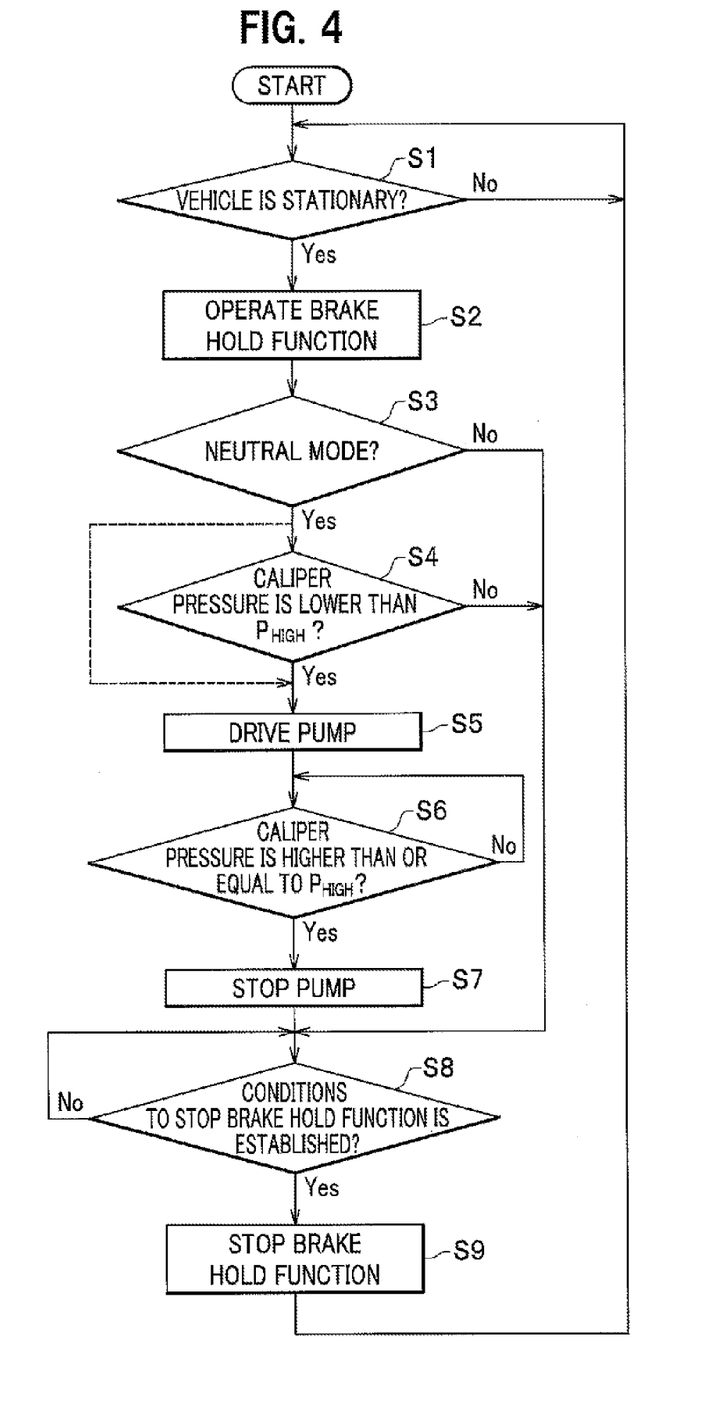
FIG. 4 is a flowchart showing a procedure in which a control unit of the first embodiment operates the brake hold function.

FIG. 4 is a flowchart showing a procedure in which the control unit operates the brake hold function. With reference to FIG. 4, the procedure in which the control unit 150 of the first embodiment operates the brake hold function will be described (see FIGS. 1 to 3D, as appropriate). The control unit 150 determines whether or not the vehicle 1 is stationary by the braking force being applied to, on the basis of the wheel speeds measured by the wheel speed sensors 35a, 35b, 35c, 35d (Step S1). In Step S1, the control unit 150 detects that the brake pedal 12 is operated to be depressed, and calculates the vehicle speed of the vehicle 1 on the basis of the wheel speeds, and then determines that the vehicle 1 is stopped (stationary) when the calculated vehicle speed is lower than the predetermined speed threshold value. If the control unit 150 determines that the vehicle 1 is stationary by the braking force being applied to (Yes in Step S1), the control unit 150 operates the brake hold function (Step 2). Specifically, the control unit 150 provides a closing instruction to the regulator valve 116 of the VSA device 18, and closes the regulator valve 116. Note that, if the control unit 150 determines that the vehicle 1 is not stationary in Step S1 (No in Step S1), the control unit 150 returns the procedure to Step S1.

Further, the control unit 150 determines whether or not the automatic transmission 3 is set in the neutral mode (non-driving mode) (Step S3). If the automatic transmission 3 is set in the neutral mode (Yes in Step S3), the control unit 150 determines whether or not the caliper pressure is lower than the predetermined pressure $P_{HIGH}$ (Step S4). If the caliper pressure is lower than the predetermined pressure $P_{HIGH}$ (Yes in Step S4), the control unit 150 drives the pump 136 of the VSA device 18 (Step S5). On the other hand, if the caliper pressure is not lower than the predetermined pressure $P_{HIGH}$ (No in Step S4), that is, if the caliper pressure is higher than or equal to the predetermined pressure $P_{HIGH}$, the control unit 150 allows the procedure to proceed to Step S8 without driving the pump 136.

Note that, the control unit 150 may be configured to drive the pump 136 in Step S5, after a predetermined time elapses after the control unit 150 provides the closing instruction to the regulator valve 116 in Step S2. Hereby, the control unit 150 can drive the pump 136 after the regulator valve 116 is closed. In this case, the predetermined time may be a time required to close the regulator valve 116, and is preferably determined in advance by experimental measurement or the like.

The control unit 150 drives the pump 136 until the caliper pressure, which is calculated on the basis of the brake hydraulic pressure of the first common hydraulic path 112 measured by the pressure sensor P1 of the VSA device 18, is increased to the predetermined pressure $P_{HIGH}$ (No in Step S6), and when the caliper pressure is higher than or equal to the predetermined pressure $P_{HIGH}$ (Yes in Step S6), the control unit 150 stops the pump 136 (Step S7). In other words, the control unit 150 increases the braking force when the braking force applied to the vehicle 1 is smaller than the braking force generated by the caliper pressure of the predetermined pressure $P_{HIGH}$.

And the control unit 150 waits until the condition for stopping the brake hold function is established (No in Step S8). Note that, the control unit 150 of the first embodiment determines that the condition for stopping the brake hold function is established, for example, when the unillustrated accelerator pedal is operated to be depressed. When the condition for stopping the brake hold function is established (Yes in Step S8), the control unit 150 provides an opening instruction to the regulator valve 116 to open the regulator valve 116, and stops the brake hold function (Step S9).

On the other hand, when the control unit 150 operates the brake hold function (Step S2), if the automatic transmission 3 is in a mode other than the neutral mode (No in Step S3), for example, if it is in the drive mode, the control unit 150 allows the procedure to proceed to Step S8 without driving the pump 136.

As described above, according to the vehicle brake system 10 (see FIG. 2) of the first embodiment, when the vehicle 1 (see FIG. 1) is stopped to be in a stationary state, the regulator valve 116 (see FIG. 2) of the VSA device 18 is closed and the brake hold function operates. At this time, if the automatic transmission 3 (see FIG. 1) is set in the neutral mode (non-driving mode), the control unit 150 (see FIG. 2) drives the pump 136 (see FIG. 2) of the VSA device 18. Hereby, the caliper pressure generated in the disc brake mechanisms 30a, 30b, 30c, 30d (see FIG. 2) is increased to the predetermined pressure $P_{HIGH}$, and the braking force applied to the vehicle 1 is increased. Therefore, even if the automatic transmission 3 is shifted to the drive mode (driving mode) when the brake hold function operates, the start of movement of the vehicle 1 due to the creep force generated at that time is suppressed, and the sense of discomfort felt by the driver is reduced.

Note that, if the automatic transmission 3 (see FIG. 1) is in the neutral mode (Yes in Step S3 in FIG. 4) when the control function 150 (see FIG. 2) operates the brake hold function, the control function 150 may be configured to drive the pump 136 (see FIG. 2) (Step S5 in FIG. 4) without determining whether or not the caliper pressure is lower than the predetermined pressure $P_{HIGH}$. In other words, as indicated by a dashed line in FIG. 4, the control unit 150 may be configured to allow the procedure to proceed to "Step S5" in the case of "Yes in Step S3". In this case, the control unit 150 may be configured to stop the pump 136 (Step S7 in FIG. 4) when the caliper pressure is increased by the predetermined differential pressure ΔP in Step S6 in FIG. 4.

Second Embodiment

Figure 5A:
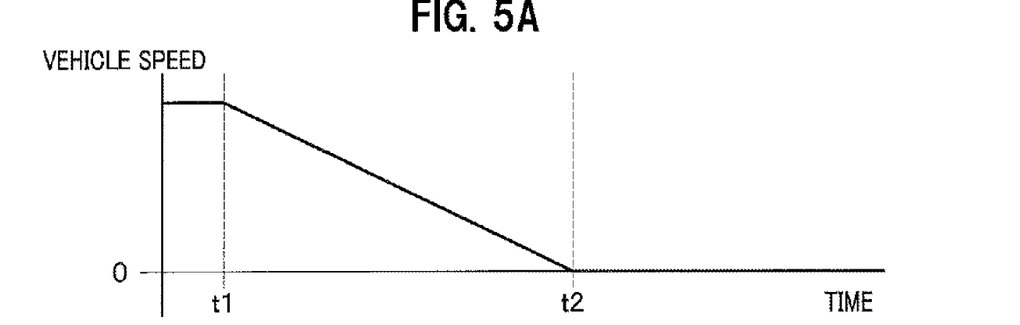
FIG. 5A is a diagram showing a state where a brake hold function is in operation in a second embodiment, and showing a variation of a vehicle speed.
Figure 5B:
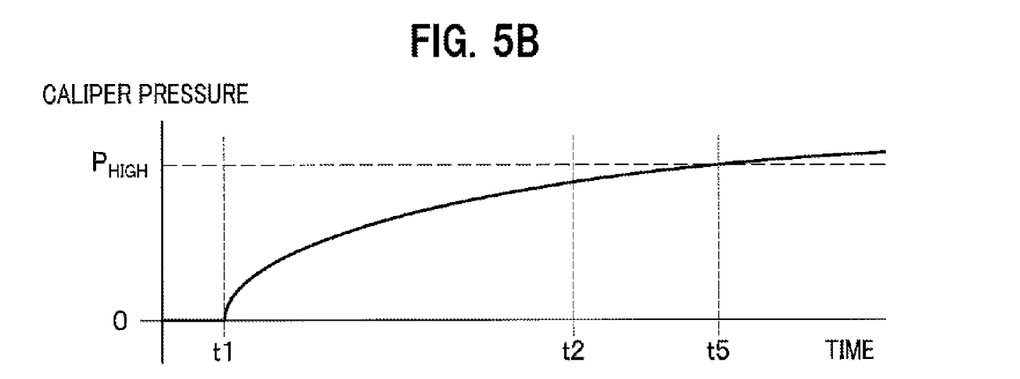
FIG. 5B is a diagram showing a state where a brake hold function is in operation in the second embodiment, and showing a variation of a caliper pressure.
Figure 5C:
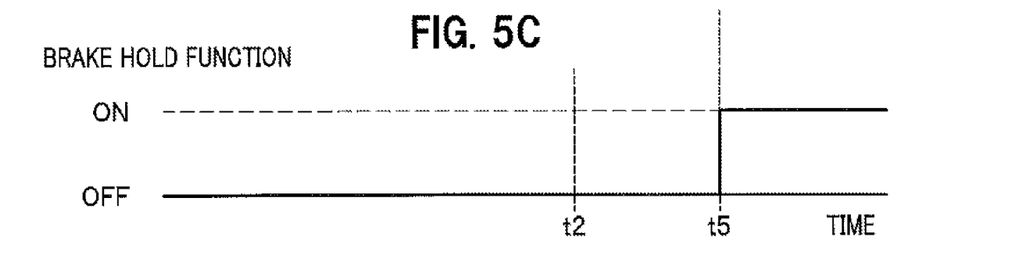
FIG. 5C is a diagram showing a state where a brake hold function is in operation in the second embodiment, and showing a time course of an operating state (ON, OFF) of the brake hold function.
Figure 5D:
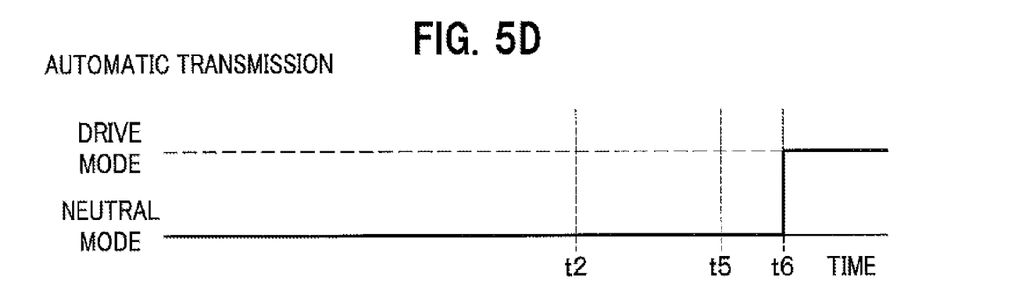
FIG. 5D is a diagram showing a state where a brake hold function is in operation in the second embodiment, and showing a time course of a mode (drive mode, neutral mode) of an automatic transmission.

FIGS. 5A to 5D are diagrams showing a state where a brake hold function is in operation in a second embodiment. Note that, a vertical axis of FIG. 5A indicates the vehicle speed, a vertical axis of FIG. 5B indicates the caliper pressure, and horizontal axes of FIGS. 5A, 5B indicate the times. Further, FIG. 5C shows a time course of an operating state (ON, OFF) of the brake hold function, and FIG. 5D shows a time course of the mode (drive mode, neutral mode) of the automatic transmission.

A vehicle brake system according to the second embodiment of the present invention has the same configuration as that of the vehicle brake system 10 of the first embodiment shown in FIGS. 1, 2. If the automatic transmission 3 is set in the neutral mode (non-driving mode), even if the control unit 150 of the second embodiment determines that the vehicle 1 is stationary after the vehicle speed of the vehicle 1 (see FIG. 1) becomes lower than a predetermined speed threshold value, the control unit 150 does not operate the brake hold function at that time, but operates the brake hold function when the caliper pressure is increased to be more than or equal to the predetermined pressure $P_{HIGH}$ set in advance. In other words, when the control unit 150 of the second embodiment allows the braking force, which is generated when the caliper pressure is the predetermined pressure $P_{HIGH}$, to be a predetermined defined braking force, and determines that the vehicle 1 is stationary, while the braking force of the vehicle 1 is larger than the defined braking force, the control unit 150 operates the brake hold function.

Specifically, when the control unit 150 (see FIG. 1) of the second embodiment determines that the vehicle 1 (see FIG. 1) is stationary in a state where the automatic transmission 3 (see FIG. 1) is set in the neutral mode (non-driving mode) at the time t2 as shown in FIG. 5A, if the control unit 150 determines that the caliper pressure is lower than the predetermined pressure $P_{HIGH}$ at this time, the control unit 150 does not operate (does not turn on) the brake hold function as shown in FIG. 5C. The predetermined pressure $P_{HIGH}$ of the caliper pressure at this time is a caliper pressure for applying the braking force, which is the defined braking force, to the vehicle 1. When the driver further depresses the brake pedal 12 (see FIG. 2), and the caliper pressure is increased to the predetermined pressure $P_{HIGH}$ at the time t5 as shown in FIG. 5B, the control unit 150 determines that the braking force applied to the vehicle 1 is larger than or equal to the defined braking force, and operates the brake hold function by closing the regulator valve 116 (see FIG. 2) of the VSA device 18. Note that, the control unit 150 may be configured to include a warning function or a display function for allowing the driver to recognize that the brake hold function operates, or that the brake hold function stops the operation.

Note that, the caliper pressure (the predetermined pressure $P_{HIGH}$) when the control unit 150 (see FIG. 1) operates the brake hold function is, for example, equivalent to the pressure $P_{HIGH}$ in the first embodiment, and is a caliper pressure through which a braking force (defined braking force in the second embodiment), that is capable of stopping the vehicle 1 (see FIG. 1) against the creep force generated when the automatic transmission 3 (see FIG. 1) is set in the drive mode, is applied to the respective wheels. Such a predetermined pressure $P_{HIGH}$ is preferably set in advance by experimental measurement or the like.

In this manner, if the automatic transmission 3 (see FIG. 1) is set in the neutral mode (non-driving mode), the control unit 150 (see FIG. 2) of the vehicle brake system 10 according to the second embodiment is configured to operates the brake hold function when the vehicle 1 (see FIG. 1) is stopped (stationary) and the caliper pressure is higher than or equal to the predetermined pressure $P_{HIGH}$ (that is, when the braking force applied to the vehicle 1 is larger than or equal to the predetermined defined braking force). Therefore, even if the automatic transmission 3 is shifted to the drive mode (driving mode) from the neutral mode (non-driving mode) at the time t6 (after the time t5) when the brake hold function operates, and the creep force is applied to the vehicle 1, the vehicle 1 does not start moving forward. As a result, when the automatic transmission 3 is shifted to the drive mode from the neutral mode during operation of the brake hold function, the vehicle 1 is suppressed from starting moving for a moment, and the sense of discomfort felt by the driver is reduced.

Note that, as in the first embodiment, the control unit 150 (see FIG. 2) of the second embodiment may be configured to determine whether or not the caliper pressure is increased to the predetermined pressure $P_{HIGH}$, on the basis of the brake hydraulic pressure in the first common hydraulic path 112 (see FIG. 2), which is calculated based on the measurement signal inputted from the pressure sensor P1 (see FIG. 2) included in the VSA device 18.

Figure 6:
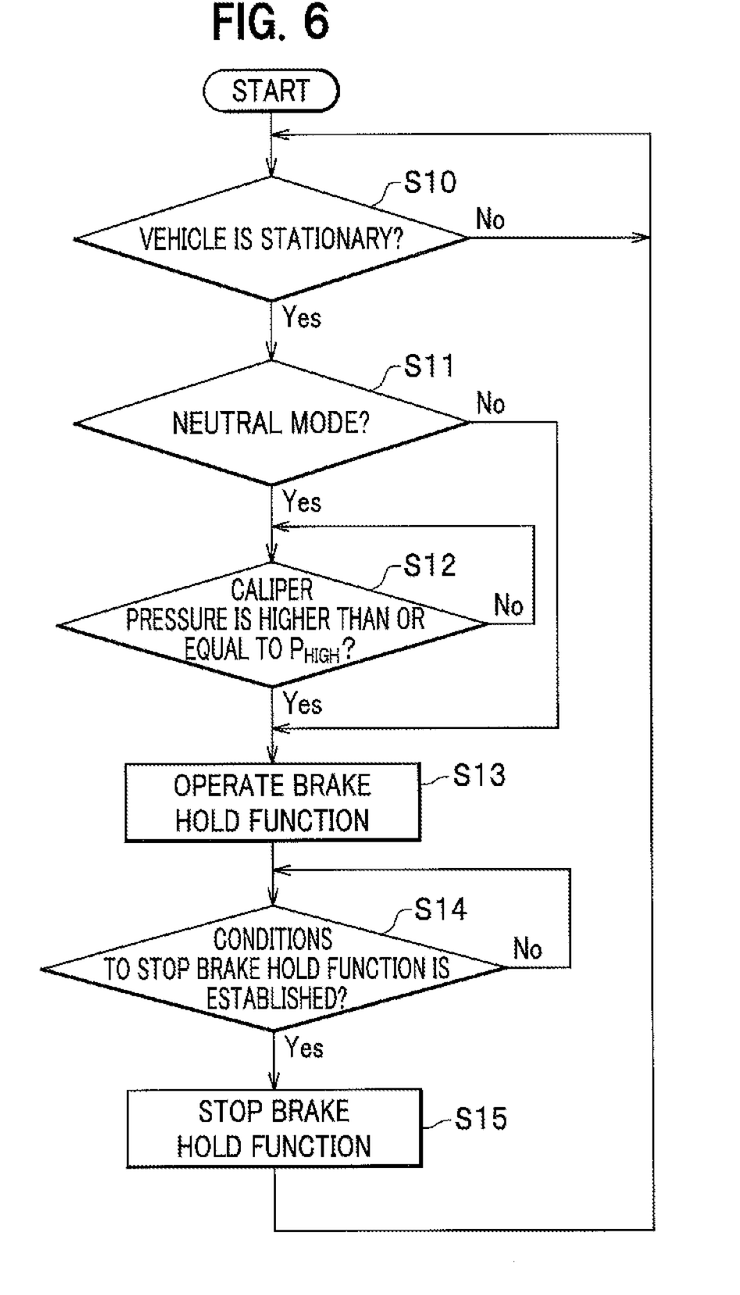
FIG. 6 is a flowchart showing a procedure in which a control unit of the second embodiment operates the brake hold function.

FIG. 6 is a flowchart showing a procedure in which the control unit of the second embodiment operates the brake hold function. With reference to FIG. 6, the procedure in which the control unit 150 of the second embodiment operates the brake hold function will be described (see FIGS. 1 to 3D, as appropriate).

The control unit 150 determines whether or not the vehicle 1 is stationary by the braking force being applied to, on the basis of the wheel speeds measured by the wheel speed sensors 35a, 35b, 35c, 35d (Step S10). In Step S10, the control unit 150 detects that the brake pedal 12 is operated to be depressed, and calculates the vehicle speed of the vehicle 1 on the basis of the wheel speeds, and then determines that the vehicle 1 is stopped (stationary) by the braking force being applied to, when the calculated vehicle speed is lower than the predetermined speed threshold value. If the control unit 150 determines that the vehicle 1 is stationary (Yes in Step S10), the control unit 150 determines whether or not the automatic transmission 3 is in the neutral mode (non-driving mode) (Step 11). If the control unit 150 determines that the automatic transmission 3 is not in the neutral mode (No in Step S11), for example, when it determines that the automatic transmission 3 is in the drive mode (driving mode), it operates the brake hold function (Step S13). Specifically, the control unit 150 provides a closing instruction to the regulator valve 116 of the VSA device 18, and closes the regulator valve 116. Note that, if the control unit 150 determines that the vehicle 1 is not stationary in Step S10 (No in Step S10), the control unit 150 returns the procedure to Step S10.

Further, if the control unit 150 determines that the automatic transmission 3 is in the neutral mode in Step S11 (Yes in Step S11), the control unit 150 determines whether or not the caliper pressure is higher than or equal to the predetermined pressure $P_{HIGH}$ (Step S12). That is, in Step S12, the control unit 150 determines whether or not the braking force of the vehicle 1 is larger than or equal to the defined braking force. Then, the control unit 150 waits until the caliper pressure becomes larger than or equal to the predetermined pressure $P_{HIGH}$ (No in Step S12), and when the caliper pressure is larger than or equal to the predetermined pressure $P_{HIGH}$ (Yes in Step S12), the control unit 150 allow the procedure to proceed to Step S13, and operates the brake hold function.

And the control unit 150 waits until the condition for stopping the brake hold function is established (No in Step S14). Note that, as in the first embodiment, the control unit 150 determines that the condition for stopping the brake hold function is established, for example, when the unillustrated accelerator pedal is operated to be depressed. When the condition for stopping the brake hold function is established (Yes in Step S14), the control unit 150 provides an opening instruction to the regulator valve 116 to open the regulator valve 116, and stops the brake hold function (Step S15).

Note that, in Step S12, when the condition for stopping the brake hold function is established, for example, by the unillustrated accelerator pedal being operated to be depressed before the caliper pressure becomes larger than or equal to the predetermined pressure $P_{HIGH}$, the control unit 150 ends the procedure without operating the brake hold function.

As described above, according to the vehicle brake system 10 (see FIG. 2) of the second embodiment, when the vehicle 1 (see FIG. 1) is stopped to be in a stationary state, if the automatic transmission 3 (see FIG. 1) is set in the non-driving mode such as the neutral mode, the regulator valve 116 (see FIG. 2) of the VSA device 18 is closed and the brake hold function operates, when the caliper pressure is larger than or equal to the predetermined pressure $P_{HIGH}$. When the caliper pressure is larger than or equal to the predetermined pressure $P_{HIGH}$, even if the creep force is applied to the vehicle 1 (see FIG. 1), the vehicle 1 is kept in the stationary state, and the start of movement of the vehicle 1 is suppressed. Therefore, even if the automatic transmission 3 is shifted to the drive mode during operation of the brake hold function, the start of movement of the vehicle 1 due to the creep force is suppressed, and the sense of discomfort felt by the driver is reduced.

As described above, the vehicle brake system 10 (see FIG. 2) of the second embodiment is configured such that the brake hold function operates when the vehicle 1 (see FIG. 1) is stationary and the braking force applied to the vehicle 1 is larger than or equal to the defined braking force, if the automatic transmission 3 (see FIG. 1) is set in the non-driving mode such as the neutral mode. With this configuration, when the automatic transmission 3 is shifted to the driving mode such as the drive mode during the operation of the brake hold function, the start of movement of the vehicle 1 due to the creep force is suppressed, and the sense of discomfort felt by the driver is reduced.

Further, the vehicle brake system 10 (see FIG. 2) of the second embodiment is configured such that the brake hold function operates when the braking force generated by the depression operation of the brake pedal 12 (see FIG. 2) is larger than or equal to the defined braking force, and it is not required to increase the braking force during the operation of the brake hold function. Therefore, for example, even if the vehicle brake system 10 does not include the pump 136 (see FIG. 2) which is the booster unit, the brake hold function can be operated so as to suppress the start of movement of the vehicle 1 (see FIG. 1) due to the creep force.

Note that, the present invention can be appropriately modified in design without departing from the spirit and scope of the invention. As shown in FIG. 2, the vehicle brake system 10 of the present embodiment is configured to include an electric brake unit in which the motor cylinder device 16 driven by the electric motor 72 generates the braking force, however, it may be, for example, a vehicle brake system including a hydraulic brake unit in which the hydraulic pressure generated in the master cylinder 34 directly drives the wheel cylinders 32 FR, 32RL, 32RR, 32FL. Further, the control unit 150 (see FIG. 2) of the first embodiment and the second embodiment is configured to calculate the caliper pressure generated in the disc brake mechanisms 30a, 30b, 30c, 30d (see FIG. 2) on the basis of the brake hydraulic pressure in the first common hydraulic path 112 (see FIG. 2) of the VSA device 18, however, it may be configured such that a pressure sensor for measuring the caliper pressure is included in the disc brake mechanisms 30a, 30b, 30c, 30d.

Further, in the second embodiment, the control unit 150 (see FIG. 2) may be configured to operate the brake hold function at the time t2 when the control unit 150 determines that the vehicle 1 (see FIG. 1) is stationary.

Further, in the first embodiment and the second embodiment, the vehicle brake system 10 may be configured to assist a start (so-called hill start) of the vehicle 1 (see FIG. 1) which is stationary on a slope (an uphill), or to keep a state in which the braking force is applied to the vehicle 1 until a driving torque capable of running is generated in the stationary vehicle 1, that is, to operate a function (a stop assisting function) for assisting a temporary stop of the vehicle 1 by holding the braking force with the braking force holding function. Note that, when such a stop assisting function operates, the driver has an intension to stop the vehicle 1 for a short time, and easily performs a next operation (for example, an operation to allow the vehicle 1 to be stationary by operating the brake pedal 12 (see FIG. 2) to be depressed) quickly if the vehicle 1 starts moving. On the other hand, in a state where the brake hold function operates for keeping the vehicle 1 in the stationary state for a long time, when the automatic transmission 3 (see FIG. 1) is shifted to the drive mode (driving mode) from the neutral mode (non-driving mode), even if the driver wants to keep the vehicle 1 in the stationary state, the vehicle 1 starts moving for a moment and the driver feels the sense of discomfort in some cases. Therefore, as described in the first embodiment or the second embodiment, the vehicle brake system 10 is preferably configured to operate the brake hold function.

Further, in the first embodiment or the second embodiment, the control unit 150 (see FIG. 2) is configured to close the regulator valve 116 (see FIG. 2) when operating the brake hold function. However, the control unit 150 is not limited thereto, but may be configured to close the first inlet valve 120 (see FIG. 2) and the second inlet valve 124 (see FIG. 2) in place of the regulator valve 116. Furthermore, the vehicle brake system 10 (see FIG. 1) of the first embodiment and the second embodiment may be not an electric servo brake system, but a brake system including a master power.

REFERENCE SIGNS LIST

1: vehicle
2: engine (power unit)
3: automatic transmission (transmission)
10: vehicle brake system
120: brake pedal (brake operation unit)
136: pump (booster unit)
150: control unit
WFR: right front wheel (driving wheel)
WFL: left front wheel (driving wheel)

The invention claimed is:

1. A vehicle brake system comprising:
   a brake operation unit for generating a braking force in response to a pressure applied by a user;
   a brake caliper operatively associated with a vehicle wheel for applying a braking force to said vehicle wheel;
   a hydraulic line for selectively interconnecting the brake operation unit and the brake caliper;
   a normally open regulator valve disposed in fluid communication with the hydraulic line and configured to hold hydraulic pressure in a portion of the hydraulic line extending between the regulator valve and the caliper when said regulator valve is closed;
   a control unit capable of determining whether a transmission is set in a driving mode or in a non-driving mode; and
   a booster unit for increasing an initial braking force generated when the brake operation unit is operated, the booster unit operable to increase an initial pressure level generated by the initial braking force in order to attain an enhanced pressure level;
   the vehicle brake system configured to selectively maintain said regulator valve in a closed configuration in order to operate a braking force holding function for holding the initial braking force, which is generated by operating the brake operation unit, in the portion of the hydraulic line extending between the regulator valve and the caliper;
   wherein the vehicle brake system is configured and arranged to operate such that:
   when the braking force is applied and a speed of the vehicle becomes lower than a predetermined speed threshold value, the control unit closes the regulator valve to operate the braking force holding function, and
   when the control unit operates the braking force holding function and determines that the transmission is set in the non-driving mode, the control unit increases the initial braking force, which is generated by operating the brake operation unit, by operating the booster unit to attain the enhanced pressure level and then holds the enhanced pressure level in the portion of said hydraulic line between the regulator valve and the caliper.

2. The vehicle brake system according to claim 1, wherein when the control unit operates the braking force holding function and determines that the transmission is set in the non-driving mode, if the braking force generated by operating the brake operation unit is smaller than a predetermined defined braking force, the control unit increases the braking force by operating the booster unit to attain the enhanced pressure level and then holds the enhanced pressure level in the portion of the hydraulic line proximate the caliper.

3. A vehicle brake system comprising:
   a brake operation unit for generating an initial braking force in response to a pressure applied by a user;
   a brake caliper operatively associated with a disc brake mechanism;
   a hydraulic line for selectively interconnecting the brake operation unit and the brake caliper;
   a control unit capable of determining whether a transmission is set in a driving mode or in a non-driving mode other than the driving mode; and
   a booster unit for increasing the initial braking force generated when the brake operation unit is operated, the booster unit operable to increase an initial pressure level generated by the initial braking force in order to attain an enhanced pressure level;
   the vehicle brake system configured to selectively maintain hydraulic pressure in a portion of the hydraulic line proximate the caliper in order to operate a braking force holding function for holding the initial braking force, which is generated by operating the brake operation unit;
   wherein the vehicle brake system is configured and arranged to operate such that:
   when the braking force is applied and a speed of the vehicle becomes lower than a predetermined speed threshold value, the control unit operates the braking force holding function, and
   when the control unit operates the braking force holding function and determines that the transmission is set in the non-driving mode, the control unit increases the initial braking force which is generated by operating the brake operation unit, by operating the booster unit to attain the enhanced pressure level and then holds the enhanced pressure level in the portion of the hydraulic line proximate the caliper.

4. The vehicle brake system according to claim 3, wherein when the control unit operates the braking force holding function and determines that the transmission is set in the non-driving mode, if the braking force generated by operating the brake operation unit is smaller than a predetermined defined braking force, the control unit increases the braking force by operating the booster unit to attain the enhanced pressure level and then holds the enhanced pressure level in the portion of the hydraulic line proximate the caliper.

5. A vehicle brake system comprising,
   a brake operation unit for generating an initial braking force in response to a pressure applied by a user;
   a brake caliper operatively associated with a disc brake mechanism;
   a hydraulic line for selectively interconnecting the brake operation unit and the brake caliper;
   a control unit capable of determining whether a transmission is set in a driving mode or in a non-driving mode other than the driving mode,
   the vehicle brake system configured to selectively maintain hydraulic pressure in a portion of the hydraulic line proximate the caliper in order to operate a braking force holding function for holding a braking force which is generated by operating the brake operation unit,
   wherein the brake system is configured and arranged to operate such that when the braking force is applied and a speed of the vehicle becomes lower than a predetermined speed threshold value, if the control unit determines that the transmission is set in the non-driving mode, the control unit operates the braking force holding function when the braking force is more than or equal to a predetermined defined braking force.

* * * * *